United States Patent Office — 3,478,011 — Patented Nov. 11, 1969

3,478,011
WATER-INSOLUBLE MONOAZO DYESTUFFS
Klaus Artz, Muttenz, Basel-Land, Switzerland, assignor to Ciba Limited, Basel, Switzerland, a company of Switzerland
No Drawing. Filed Oct. 24, 1966, Ser. No. 588,717
Claims priority, application Switzerland, Nov. 9, 1965, 15,402/65
Int. Cl. C09b 29/08; C07c 107/06
U.S. Cl. 260—205           6 Claims

ABSTRACT OF THE DISCLOSURE

Water-insoluble monoazo dyestuffs of the formula

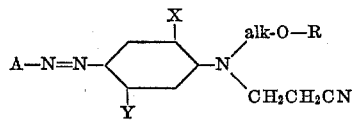

in which A represents the residue of a diazo component free from sulphonic acid and alkylsulphonyl groups, R represents an alkyl or aralkyl group, "alk" represents an alkylene group, X represents a hydrogen atom or an alkyl or alkoxy group and Y represents a hydrogen atom, a halogen atom, an alkyl group, an alkoxy group or an acylamino group are eminently suitable for dyeing synthetic fibres, especially fibres made from aromatic polyesters, and produce deep, orange to blue dyeings possessing a good fastness to light and to sublimation.

---

The present invention provides water-insoluble monoazo dyestuffs of the formula

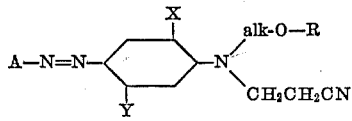

in which A represents the residue of a diazo component free from sulphonic acid and alkylsulphonyl groups, R represents an alkyl or aralkyl group, "alk" represents an alkylene group, X represents a hydrogen atom or an alkyl or alkoxy group and Y represents a hydrogen atom, a halogen atom, an alkyl group, an alkoxy group or an acylamino group.

The present invention also provides a process for the manufacture of water-insoluble monoazo dyestuffs of the above-mentioned formula which comprises coupling a diazotized amine with an azo component of the formula

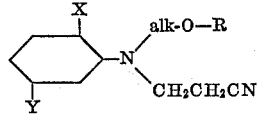

in which R, "alk," X and Y have the meanings given above.

Preferred diazo components are monocyclic or bicyclic aromatic or heterocyclic amines. Preferred aromatic amines are those of the benzene series, especially those of the formula

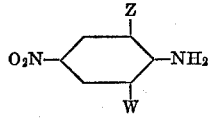

in which W represents a hydrogen or a halogen atom or a cyano, nitro or carbalkoxy group and Z represents a hydrogen or a halogen atom.

Heterocyclic amines are also suitable as diazo components for the present process, especially aminothiazoles or aminobenzthiazoles. The following amines may be mentioned as examples: 1-amino-4-methylbenzene, 1-amino-4-chlorobenzene, 1-amino-4-bromobenzene, 1-amino-4-nitrobenzene, 1-amino-4-cyanobenzene, 1-amino-4-carboxylic acid methyl ester, 1-amino-2,4-dichlorobenzene, 1-amino-2-methyl-4-chlorobenzene, 1-amino-2-trifluoromethyl-4-chlorobenzene, 1-amino-2-cyano-4-chlorobenzene, 1-amino-2-chloro-4-cyanobenzene, 1-amino-2-chloro-4-nitrobenzene, 1-amino-2,4-dicyanobenzene, 1-amino-2,6-dichloro-4-nitrobenzene, 1-amino-2-methyl-4-nitrobenzene, 1-amino-2-trifluoromethyl-4-nitrobenzene, 1-amino-2-cyano-4-nitrobenzene, 1-amino-2,4-dinitrobenzene, 1-amino-2,4-dinitro-6-chlorobenzene, 1-amino-2,4-dinitro-6-bromobenzene, 1-amino-4-acetylaminobenzene, 2-amino-6-cyano-benzthiazole, 2-amino-6-nitro-benzthiazole, 2-amino-6-methoxy-benzthiazole, 2-amino-5-nitrothiazole, 2-amino-5-cyanothiazole, 2-amino-5-carbethoxythiazole, 2-amino-4-methyl-5-cyanothiazole, 2-amino-4,5-dicyanothiazole, 2-amino-5-nitro-thio(1)-diazole-(3,4), 2-amino-4-phenyl-thio(1) - diazole-(3,5),2-amino-4-methyl-thio(1)-diazole-(3,5) and 2-amino-4-methoxy-thio(1)-diazole-(3,5).

Preferred azo components are amines of the formula

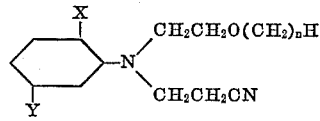

in which X and Y have the meanings given above and n is an integer of from 1 to 4.

The following azo components may be mentioned as examples:

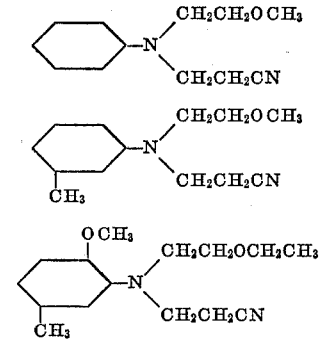

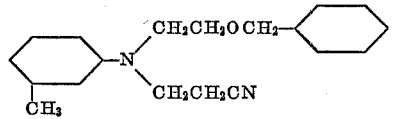

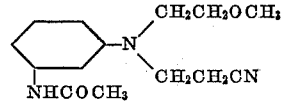

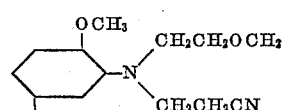

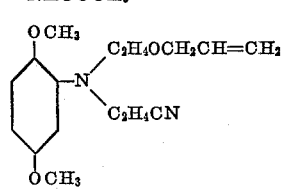

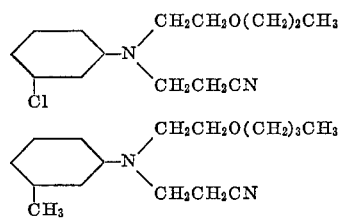

The above azo components are obtainable by methods known per se, for example, by alkylation of a monocyanoethylaniline with the appropriate 2-alkyl-hydroxyethanol-benzene sulphonic ester.

Coupling is carried out by a method known per se, for example, in a neutral to acid medium, if desired, in the presence of sodium acetate, or another buffer or a catalyst having an influence on the rate of coupling, for example, pyridine or a salt thereof.

After the coupling reaction, the dyestuffs formed may be isolated from the coupling mixture, for example, by filtration, as they are substantially insoluble in water.

Instead of a single diazo component, it is also possible to use a mixture of two or more of the diazo components of the invention, and, instead of a single azo component, it is possible to use a mixture of two or more of the azo components of the invention.

After conversion into a state of fine division, the new monoazo dyestuffs are eminently suitable for dyeing synthetic fibres, especially fibres made from aromatic polyesters. They produce deep orange to blue dyeings possessing a good fastness to light and to sublimation.

Compared with the dyestuffs described in British patent specification No. 813,906, which contain an N-acyloxyalkyl group instead of an N-alkoxyalkyl group, the dyestuffs obtainable by the process of the invention are distinguished by a lower sensitivity to alkali.

For dyeing, the new dyestuffs are advantageously used in a state of fine division, and dyeing is carried out in the presence of a dispersing agent, for example, soap, sulphite cellulose waste liquor or a synthetic detergent or in the presence of a mixture of different wetting and dispersing agents. Prior to dyeing, it is generally advantageous to convert the dyestuffs into a dyeing preparation which contains a dispersing agent and finely divided dyestuff in a form such that a fine dispersion is formed when the dyestuff preparation is diluted with water. Dyestuff preparations of the kind defined are obtainable by a method known per se, for example, by reprecipitating the dyestuff from sulphuric acid and grinding the suspension so obtained with sulphite cellulose waste liquor, if necessary, also by grinding the dyestuff in a highly efficient grinding device in the dry or wet state in the absence or presence of a dispersing agent.

By virtue of their fastness to alkali, the new dyestuffs are especially suitable for application by the so-called thermofixation process in which the fabric to be dyed is impregnated at a temperature preferably not exceeding 60° C. with an aqueous dispersion of the dyestuff which advantageously contains within the range of from 1 to 50 percent of urea and a thickening agent, especially sodium alginate, and then squeezed in the usual manner. Squeezing is advantageously effected in a manner such that the impregnated fabric retains within the range of from 50 to 100 percent of its dry weight of dye liquor.

In order to bring about fixation of the dyestuff, the fabric so impregnated is heated to a temperature above 100° C., for example, to a temperature within the range of from 180° C. to 220° C., this heat treatment preferably being carried out after a drying process, for example, in a current of warm air.

The above-mentioned thermofixation process is of special interest in the dyeing of union fabrics made from polyester fibres and cellulosic fibres, especially cotton. In this case, the padding liquor contains, in addition to the dyestuffs of the invention, dyestuffs that are suitable for dyeing cotton, especially vat dyestuffs or reactive dyestuffs, that is to say, dyestuffs that can be fixed on the cellulosic fibre by formation of a chemical bond, for example, dyestuffs which contain a chlorotriazine or chlorodiazine residue. In the latter case it is advantageous to add an agent capable of binding acid to the padding solution, for example, an alkali carbonate, an alkali phosphate, an alkali borate or an alkali perborate, or mixtures of two or more such compounds. When using vat dyestuffs, the fabric must be treated with an aqueous alkaline solution of one of the reducing agents which may be used in vat dyeing subsequent to the heat treatment. The dyeings so obtained are advantageously subjected to an after-treatment, for example, by heating with an aqueous solution of a non-ionic washing agent.

By virtue of the fact that they ensure good reservation of wool, the dyestuffs of the invention are also very suitable for use in the dyeing of union fabrics made from polyester fibres and wool.

The dyestuffs can also be applied by printing techniques. In this application the printing pastes contain the customary printing adjuvants, for example, wetting and thickening agents, in addition to the finely divided dyestuff, and if necessary, one of the above-mentioned cotton dyestuffs, if necessary, in the presence of urea and/or an agent capable of binding acid.

The following examples illustrate the invention. Unless otherwise stated, the parts and percentages are by weight.

EXAMPLE 1

13.8 parts of 1-amino-4-nitrobenzene are dissolved in 30 parts of water and 30 parts of concentrated hydrochloric acid. 80 parts of ice are added followed by 6.9 parts of sodium nitrite, and the batch is stirred until the diazo solution is clear and almost colourless. The diazo solution so obtained is then run into a solution of 20.4 parts of N-cyanoethyl-N-methoxy-ethylaniline in 600 parts by volume of 2 N sulphuric acid. A saturated sodium acetate solution is added to precipitate the dyestuff of the formula

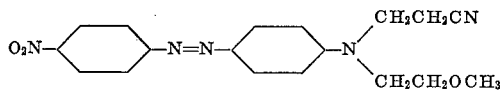

which dyes cellulose acetate rayon, nylon, triacetate rayon and polyester fibres brilliant orange tints.

EXAMPLE 2

17.25 parts of 1-amino-2-chloro-4-nitrobenzene are introduced in portions into 60 parts of concentrated sulphuric acid in which 6.9 parts of sodium nitrite have been dissolved. A clear yellow solution is obtained by puring the batch onto 400 parts of ice.

The diazo solution so obtained is added to a solution of 28.0 parts of N-cyanoethyl-N-benzyloxyethylaniline in 100 parts by volume of glacial acetic acid, as described in Example 1. The dyestuff which is precipitated by the addition of sodium acetate dyes cellulose acetate rayon, nylon, cellulose triacetate rayon and polyester fibres red tints.

EXAMPLE 3

16.3 parts of 1-amino-2-cyano-4-nitrobenzene are diazotized in the manner described in Example 2.

The diazo solution so obtained is added in the manner described in Example 1 to a solution of 25.3 parts of 3-chloro-N-cyanoethyl - N - ethoxyethylaniline in 600 parts by volume of 2 N sulphuric acid. The dyestuff so formed, which is completely precipitated with the aid of sodium acetate, dyes cellulose acetate rayon, nylon, cellulose triacetate rayon and polyester fibres bluish red tints.

EXAMPLE 4

19.6 parts of 1-amino-2-carbomethoxy-4-nitrobenzene are diazotized in the manner described in Example 2.

The diazo solution so obtained is added in the manner described in Example 1 to a solution of 26.1 parts of 3-acetamino - N-cyanoethyl-N-methoxyethyl-aniline in 600 parts by volume of 2 N sulphuric acid. The dyestuff which is precipitated with sodium acetate dyes cellulose acetate rayon, nylon, cellulose triacetate rayon and polyester fibres bluish red tints.

EXAMPLE 5

19.75 parts of 1-amino-2,6-dichloro-4-nitrobenzene are added in portions to 60 parts of concentrated sulphuric acid in which 6.9 parts of sodium nitrite have been dissolved. A clear, yellow solution is obtained by pouring the batch on to 400 parts of ice.

The diazo solution so obtained is run into a solution containing 29.1 parts of 1-methoxy-2-(N-cyanoethyl-N-methoxyethyl)-amino-4-propionyl-aminobenzene in 100 parts by volume of glacial acetic acid. The dyestuff which is precipitated by the addition of sodium acetate dyes cellulose acetate rayon, nylon, cellulose triacetate rayon and polyester fibres violet tints.

EXAMPLE 6

21.7 parts of 1-amino-2-bromo-4-nitrobenzene are diazotized in the manner described in Example 5.

The diazo solution so obtained is added to a solution of 1,4 - dimethoxy-2-(N-cyanoethyl-N-methoxyethyl)-aminobenzene in 100 parts by volume of glacial acetic acid, and precipitation is effected with sodium acetate. The dyestuff so formed dyes cellulose acetate rayon, nylon, cellulose triacetate rayon and polyester fibres bluish red tints.

Further dyestuffs are listed in the following table which are obtained when the diazo component listed in Column I is diazotized in the manner described in the preceding examples and coupled with the coupling component listed in Column II. The tints obtained on polyester fibres are listed in Column III.

| | I | II | III |
|---|---|---|---|
| 1 | 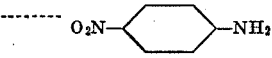 | 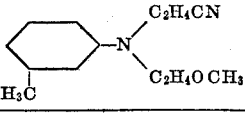 | Orange-red. |
| 2 | 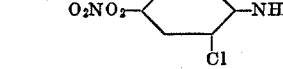 | 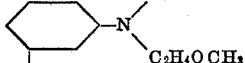 | Red. |
| 3 |  | 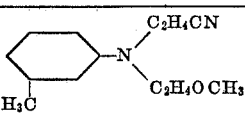 | Bluish-red. |
| 4 | 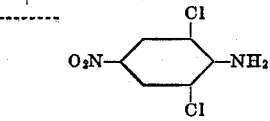 | 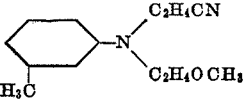 | Yellowish-red. |
| 5 | 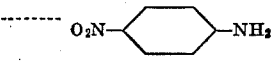 | 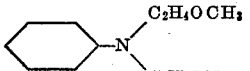 | Orange. |
| 6 | 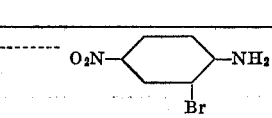 | 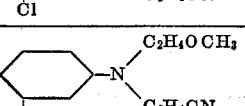 | Scarlet. |
| 7 | 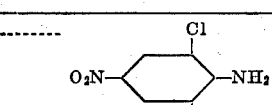 | 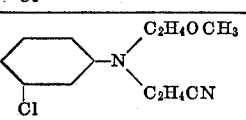 | Brownish-orange. |
| 8 | 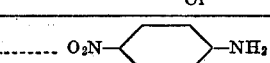 | 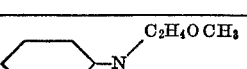 | Red. |
| 9 | 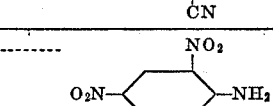 | 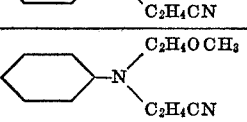 | Red. |
| 10 | 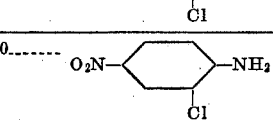 | 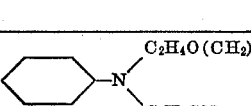 | Red. |
| 11 | 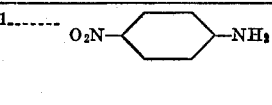 | 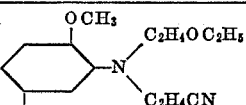 | Red. |

| | I | II | III |
|---|---|---|---|
| 12 | 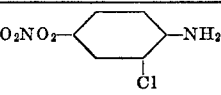 O₂NO₂—⟨C₆H₃(Cl)⟩—NH₂ | 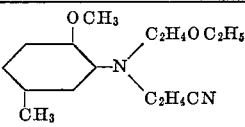 CH₃O—⟨C₆H₃(CH₃)⟩—N(C₂H₄OC₂H₅)(C₂H₄CN) | Violet-red. |
| 13 | 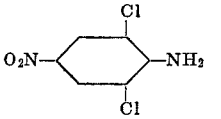 O₂N—⟨C₆H₂(Cl)(Cl)⟩—NH₂ | 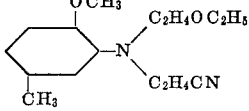 CH₃O—⟨C₆H₃(CH₃)⟩—N(C₂H₄OC₂H₅)(C₂H₄CN) | Brownish-red. |
| 14 | 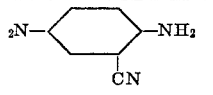 O₂N—⟨C₆H₃(CN)⟩—NH₂ | 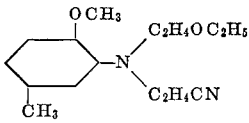 CH₃O—⟨C₆H₃(CH₃)⟩—N(C₂H₄OC₂H₅)(C₂H₄CN) | Violet. |

EXAMPLE 7

Five parts of 2-aminothiazole are added in portion to 30 parts of concentrated sulphuric acid in which 3.5 parts of sodium nitrite have been dissolved. A clear, yellow solution is obtained when the batch is poured on to 200 parts of ice.

The diazo solution so obtained is run into a solution of 13.0 parts of 3-acetamino-N-cyanoethyl-N-methoxyethyl-aniline in 300 parts by volume of 2 N sulphuric acid. The addition of saturated sodium acetate solution precipitates a dyestuff which dyes cellulose acetate rayon, nylon, cellulose triacetate rayon and Terylene orange-red tints.

EXAMPLE 8

2.9 parts of 2-amino-5-nitrothiazole are introduced in portions into a mixture of 10 parts by volume of concentrated sulphuric acid in which 1.4 parts of sodium nitrite have been dissolved and 20 parts by volume of glacial acetic acid, the addition being made at 0° C. The batch is then stirred for 3 hours at 0 to 5° C.

1 part of urea is added and the clear diazo solution so obtained is run into a solution of 4 parts of N-cyanoethyl-N-methoxyethyl-aniline in 120 parts of 2 N sulphuric acid while cooling with ice. The addition of a saturated sodium acetate solution precipitates a dyestuff which dyes cellulose acetate rayon, nylon, cellulose triacetate rayon and Terylene violet tints.

EXAMPLE 9

4.6 parts of sodium nitrite are strewn into 33 parts by volume of concentrated sulphuric acid, the batch is heated at 75° C. until dissolution is complete, cooled to 0° C., and then 72 parts by volume of a 6:1 mixture of glacial acetic acid and propionic acid are added dropwise.

10.5 parts of 2-amino-6-cyanobenzthiazole, dissolved hot in 340 parts by volume of a 6:1 mixture of glacial acetic acid and propionic acid, are added dropwise to this solution in a manner such that the temperature does not rise above 20° C. After stirring for 2 hours, a solution of 14.4 parts of N-cyanoethyl-N-methoxyethyl-aniline dissolved in 150 parts by volume of glacial acetic acid is added dropwise to the above diazo solution. After the addition of ice and sodium acetate, the dyestuff is isolated by filtration. It dyes cellulose acetate rayon, nylon and polyester fibers brilliant scarlet tints.

The amines listed in Column I of the following table, when diazotized in the manner described in this example and coupled with the azo compounds listed in Column II, yield dyestuffs which dye cellulose acetate rayon, nylon, cellulose triacetate rayon and Terylene the tints listed in Column III.

| | II | III |
|---|---|---|
| 1 ..... 2-aminothiazole | 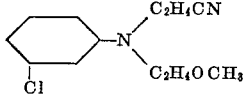 ⟨C₆H₃(Cl)⟩—N(C₂H₄CN)(C₂H₄OCH₃) | Orange-brown. |
| 2 ..... 2-amino-5-nitrothiazole | 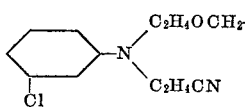 ⟨C₆H₃(Cl)⟩—N(C₂H₄OCH₂—C₆H₅)(C₂H₄CN) | Reddish-blue. |
| 3 ..... 2-amino-5-nitrothiazole | 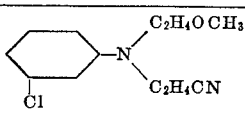 ⟨C₆H₃(Cl)⟩—N(C₂H₄OCH₃)(C₂H₄CN) | Violet. |
| 4 ..... 2-amino-5-nitrothiazole | 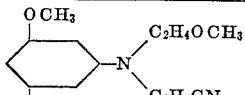 CH₃O—⟨C₆H₃(CH₃)⟩—N(C₂H₄OCH₃)(C₂H₄CN) | Blue. |
| 5 ..... 2-amino-5-nitrothiazole | 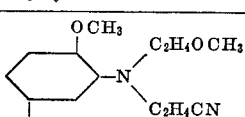 CH₃O—⟨C₆H₂(NHCOCH₃)⟩—N(C₂H₄OCH₃)(C₂H₄CN) | Blue. |

| | I | II | III |
|---|---|---|---|
| 6 | 2-amino-5-nitrothiazole | 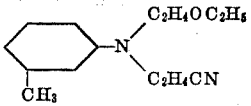 C₂H₄OC₂H₅ / N–C₂H₄CN, cyclohexyl with CH₃ | Reddish-blue. |
| 7 | 2-amino-5-nitrothiazole | 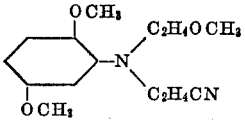 OCH₃, N(C₂H₄OCH₃)(C₂H₄CN), OCH₃ | Greenish-blue. |
| 8 | 2-amino-4-methyl-5-nitrothiazole | 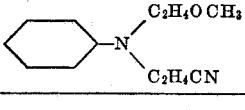 N(C₂H₄OCH₃)(C₂H₄CN) | Violet. |
| 9 | 2-amino-4-methyl-5-nitrothiazole | 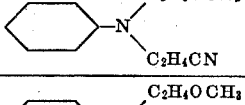 N(C₂H₃OCH₂–phenyl)(C₂H₄CN) | Violet. |
| 10 | 2-amino-4-methyl-5-nitrothiazole | 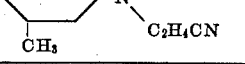 N(C₂H₄OCH₃)(C₂H₄CN), CH₃ | Violet. |
| 11 | 2-amino-4-methyl-5-nitrothiazole | 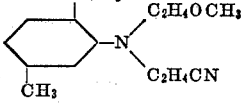 OCH₃, N(C₂H₄OCH₃)(C₂H₄CN), CH₃ | Blue. |
| 12 | 2-amino-4-methylthiazole | 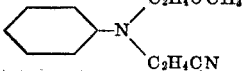 N(C₂H₄OCH₃)(C₂H₄CN) | Red. |
| 13 | 2-amino-4-(4'-nitro)-phenylthiazole | 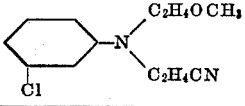 N(C₂H₄OCH₃)(C₂H₄CN), Cl | Red. |
| 14 | 2-amino-4-(4'-nitro)-phenylthiazole | 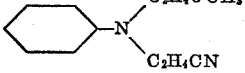 N(C₂H₄OCH₃)(C₂H₄CN) | Red. |
| 15 | 2-amino-4-(4'-nitro)-phenyl-5-nitrothiazole | 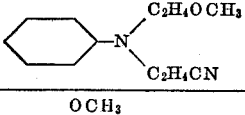 N(C₂H₄OCH₃)(C₂H₄CN) | Bluish-violet. |
| 16 | 2-amino-4-(4'-nitro)-phenyl-5-nitrothiazole | 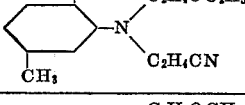 OCH₃, N(C₂H₄OC₂H₅)(C₂H₄CN), CH₃ | Greenish-blue. |
| 17 | 2-amino-4-(4'-nitro)-phenyl-5-nitrothiazole | 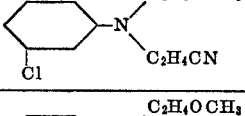 N(C₂H₄OCH₃)(C₂H₄CN), Cl | Violet-blue. |
| 18 | 2-amino-4-(4'-chloro)-phenyl-5-nitrothiazole | 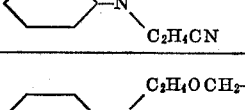 N(C₂H₄OCH₃)(C₂H₄CN) | Reedish-blue. |
| 19 | 2-amino-4-(4'-chloro)-phenylthiazole | 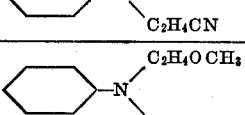 N(C₂H₄OCH₂–phenyl)(C₂H₄CN) | Red. |
| 20 | 2-amino-1,3,4-thiadiazole | 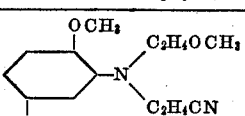 N(C₂H₄OCH₃)(C₂H₄CN) | Red. |
| 21 | 2-amino-1,3,4-thiadiazole | 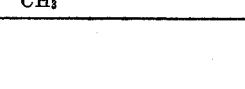 OCH₃, N(C₂H₄OCH₃)(C₂H₄CN), CH₃ | Red. |

| I | II | III |
|---|---|---|
| 22 ... 2-amino-3-nitro-5-acetylthiophene | phenyl-N(C₂H₄OCH₃)(C₂H₄CN) | Blue. |
| 23 ... 2-amino-3-nitro-5-acetylthiophene | 2-OCH₃, 5-CH₃-phenyl-N(C₂H₄OC₂H₅)(C₂H₄CN) | Greenish-blue. |
| 24 ... 2-amino-5-nitrothiazole | phenyl-N(C₂H₄CN)(C₂H₄—O—C₂H₅) | Violet. |
| 25 ... 2-amino-benzothiazole | 3-Cl-phenyl-N(C₂H₄OCH₃)(C₂H₄CN) | Orange. |
| 26 ... 2-amino-6-nitro-benzothiazole | 3-CH₃-phenyl-N(C₂H₄OC₂H₅)(C₂H₄CN) | Violet. |
| 27 ... 2-amino-6-cyanobenzthiazole | 3-CH₃-phenyl-N(C₂H₄OC₃H₇)(C₂H₄CN) | Red. |
| 28 ... 2-amino-6-cyanobenzthiazole | 3-NHCOCH₃-phenyl-N(C₂H₄OCH₃)(C₂H₄CN) | Bluish-red. |

What is claimed is:

1. A water-insoluble monoazo dyestuff of the formula $$A-N=N-\underset{Y}{\overset{X}{\bigcirc}}-N\begin{pmatrix}alk-OR\\CH_2CH_2CN\end{pmatrix}$$

in which A is phenyl or phenyl substituted by chlorine or bromine atoms, nitro- or cyano groups, "alk" is lower alkylene, R is lower alkyl or phenyl-lower-alkyl, X is hydrogen, lower alkyl or lower alkoxy, and Y is hydrogen, chlorine, bromine, lower alkyl, lower alkoxy, or lower-alkanoylamino.

2. A water-insoluble monoazo dyestuff as claimed in claim 1 which has the formula $$O_2N-\underset{W}{\overset{Z}{\bigcirc}}-N=N-\underset{Y}{\overset{X}{\bigcirc}}-N\begin{pmatrix}CH_2CH_2OR\\CH_2CH_2CN\end{pmatrix}$$

in which W is hydrogen, chlorine, bromine, or nitro, cyano or lower carbalkoxy, Z is hydrogen or chlorine, bromine, R is lower alkyl or phenyl-lower-alkyl, X is hydrogen, lower alkyl or lower alkoxy, and Y is hydrogen, chlorine, bromine, lower alkyl, lower alkoxy or lower alkanoylamino.

3. The dyestuff as claimed in claim 1 of the formula

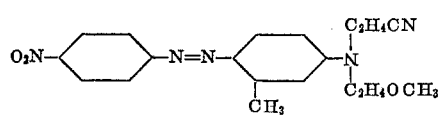

4. The dyestuff as claimed in claim 1 of the formula

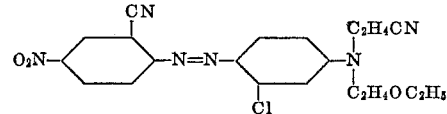

5. The dyestuff as claimed in claim 1 of the formula

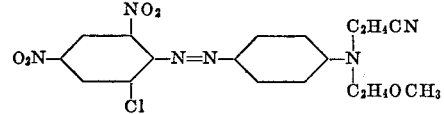

6. The dyestuff as claimed in claim 1 of the formula

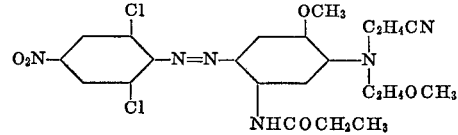

References Cited

UNITED STATES PATENTS

| 2,873,270 | 2/1959 | Merian | 260—205 |
| 3,050,516 | 8/1962 | Merian et al. | 260—205 |
| 3,084,153 | 4/1963 | Fishwick et al. | 260—158 |
| 3,105,829 | 10/1963 | Merian et al. | 260—158 |
| 3,280,101 | 10/1966 | Straley et al. | 260—158 |
| 3,329,669 | 7/1967 | Sartori | 260—158 |

CHARLES B. PARKER, Primary Examiner

DONALD M. PAPUGA, Assistant Examiner

U.S. Cl. X.R.

8—41, 54.2, 55, 54; 260—207, 206, 207.1, 158, 152, 465